(12) United States Patent
Kikuya et al.

(10) Patent No.: US 8,574,765 B2
(45) Date of Patent: Nov. 5, 2013

(54) LI-NI COMPOSITE OXIDE PARTICLES FOR NON-AQUEOUS ELECTROLYTE SECONDARY BATTERY, PROCESS FOR PRODUCING THE SAME, AND NON-AQUEOUS ELECTROLYTE SECONDARY BATTERY

(75) Inventors: Kazuhiko Kikuya, Fukuoka-ken (JP); Osamu Sasaki, Fukuoka-ken (JP); Teruaki Santoki, Fukuoka-ken (JP); Hiroshi Yamamoto, Yamaguchi-ken (JP)

(73) Assignee: Toda Kogyo Corporation, Otake-Shi, Hiroshima-Ken (JP)

( * ) Notice: Subject to any disclaimer, the term of this patent is extended or adjusted under 35 U.S.C. 154(b) by 927 days.

(21) Appl. No.: 12/529,809

(22) PCT Filed: Mar. 5, 2008

(86) PCT No.: PCT/JP2008/000454
§ 371 (c)(1),
(2), (4) Date: Dec. 22, 2009

(87) PCT Pub. No.: WO2008/123011
PCT Pub. Date: Oct. 16, 2008

(65) Prior Publication Data
US 2010/0099027 A1    Apr. 22, 2010

(30) Foreign Application Priority Data
Mar. 5, 2007  (JP) ................................ 2007-054861

(51) Int. Cl.
*H01M 4/00* (2006.01)
*H01M 4/50* (2010.01)

(52) U.S. Cl.
USPC ........ 429/223; 429/224; 429/221; 429/231.5; 429/231.6

(58) Field of Classification Search
None
See application file for complete search history.

(56) References Cited

U.S. PATENT DOCUMENTS

| | | |
|---|---|---|
| 2002/0076613 A1 | 6/2002 | Lee et al. |
| 2006/0275667 A1 | 12/2006 | Watanabe et al. |
| 2007/0122705 A1 | 5/2007 | Paulsen et al. |
| 2010/0264363 A1 | 10/2010 | Paulsen et al. |

FOREIGN PATENT DOCUMENTS

| | | |
|---|---|---|
| JP | 9-35715 | 2/1997 |
| JP | 9-50810 | 2/1997 |
| JP | 11-162466 | 6/1999 |
| JP | 2003-331841 | 11/2003 |
| JP | 2006-302880 | 11/2006 |
| JP | 2007-317585 | 12/2007 |
| WO | WO 2005/064715 A1 | 7/2005 |

OTHER PUBLICATIONS

Extended European Search Report in EP 08 72 0340 dated Feb. 15, 2011.
Sun et al, "Synthesis and Characterization of Li[(Ni$_{0.8}$Co$_{0.1}$)$_{0.8}$ ... with the Microscale Core-Shell Structure as the Positive Electrode Material for Lithium Batteries", J. Am. Chem. Soc. 2005, 127, 13411-13418.
International Search Report for PCT/JP2008/000454 mailed Jun. 10, 2008.

*Primary Examiner* — Milton I Cano
*Assistant Examiner* — Sarah A Slifka
(74) *Attorney, Agent, or Firm* — Nixon & Vanderhye P.C.

(57) ABSTRACT

Li—Ni composite oxide particles for a non-aqueous electrolyte secondary battery with a large charge/discharge capacity and excellent thermal stability in a charged condition. The Li—Ni composite oxide secondary particles form core particles having a composition $Li_{x1}Ni_{1-y1-z1-w1}Co_{y1}Mn_{z1}M_{w1}O_2$ in which $0.9 \le x1 \le 1.3$; $0.1 \le y1 \le 0.3$; $0.0 \le z1 \le 0.3$; $0 \le w1 \le 0.1$; and M is Al or Fe. The Li—Ni composite oxide has a composition $Li_{x2}Ni_{1-y2-z2-w2}Co_{y2}Mn_{z2}M_{w2}O_2$ in which $0.9 \le x2 \le 1+z2$; $0 \le y2 \le 0.33$; $0 \le z2 \le 0.5$; $0 \le w2 \le 0.1$; and M is Al, Fe, Mg, Zr or Ti and is coated or present on a surface of the secondary particles.

8 Claims, 2 Drawing Sheets

US 8,574,765 B2

LI-NI COMPOSITE OXIDE PARTICLES FOR NON-AQUEOUS ELECTROLYTE SECONDARY BATTERY, PROCESS FOR PRODUCING THE SAME, AND NON-AQUEOUS ELECTROLYTE SECONDARY BATTERY

This application is the U.S. national phase of International Application No. PCT/JP2008/000454 filed 5 Mar. 2008 which designated the U.S. and claims priority to Japanese Patent Application No. 2007-054861 filed 5 Mar. 2007, the entire contents of each of which are hereby incorporated by reference.

TECHNICAL FIELD

The present invention relates to Li—Ni composite oxide particles for a non-aqueous electrolyte secondary battery which exhibit a large charge/discharge capacity and are excellent in thermal stability under a charged condition.

BACKGROUND ART

With the recent rapid development of portable and cordless electronic devices such as audio-visual (AV) devices and personal computers, there is an increasing demand for secondary batteries or batteries having a small size, a light weight and a high energy density as a power source for driving these electronic devices. Also, in consideration of global environments, electric vehicles and hybrid electric vehicles have been recently developed and put into practice, so that there is an increasing demand for lithium ion secondary batteries for large size applications having excellent storage characteristics. Under these circumstances, lithium ion secondary batteries having advantages such as large charge/discharge capacity and good storage characteristics have been noticed.

Hitherto, as positive electrode active materials useful for high energy-type lithium ion secondary batteries exhibiting a 4 V-grade voltage, there are generally known $LiMn_2O_4$ having a spinel structure, $LiMnO_2$ having a zigzag layer structure, $LiCoO_2$ and $LiNiO_2$ having a layer rock-salt structure, or the like. Among the secondary batteries using these active materials, lithium ion secondary batteries using $LiNiO_2$ have been noticed because of large charge/discharge capacity thereof. However, the materials tend to be deteriorated in thermal stability under a charged condition and charge/discharge cycle, and, therefore, it has been required to further improve properties thereof.

Specifically, when lithium ions are released from $LiNiO_2$, the crystal structure of $LiNiO_2$ suffers from Jahn-Teller distortion since $Ni^{3+}$ is converted into $Ni^{4+}$. When the amount of Li released reaches 0.45, the crystal structure of such a lithium-released region of $LiNiO_2$ is transformed from hexagonal system into monoclinic system, and a further release of lithium therefrom causes transformation of the crystal structure from monoclinic system into hexagonal system. Therefore, when the charge/discharge reaction is repeated, the crystal structure of $LiNiO_2$ tends to become unstable, so that the resulting secondary battery tends to suffer from poor cycle characteristics and reaction between $LiNiO_2$ and an electrolyte solution owing to release of oxygen therefrom, resulting in deterioration in thermal stability and storage characteristics of the battery. To solve these problems, there have been made studies on materials formed by adding Co and Al to a part of Ni of $LiNiO_2$. However, these materials have still failed to solve the above-described problems. Therefore, it has still been required to provide a Li—Ni composite oxide having a more stabilized crystal structure.

Further, in the process for producing the Li—Ni composite oxide, in order to obtain the Li—Ni composite oxide having a high packing property and a stable crystal structure, it is required to use Ni composite hydroxide particles which are well controlled in properties, crystallinity and contents of impurities, and calcine the particles under the condition which is free from inclusion of $Ni^{2+}$ into Li sites thereof.

More specifically, it is required to provide Li—Ni composite oxide capable of exhibiting a high packing property, a stable crystal structure and an excellent thermal stability under a charged condition as a positive electrode active material for a non-aqueous electrolyte secondary battery.

Hitherto, in order to improve various properties such as stabilization of a crystal structure and charge/discharge cycle characteristics, various improvements of $LiNiO_2$ particles have been attempted. For example, there is known the technique of coating the surface of $LiNiO_2$ with a Li—Ni—Co—Mn composite oxide to improve cycle characteristics and thermal stability thereof (Patent Document 1). Also, there are known the technique of mixing a Li—Co composite oxide and a Li—Ni—Co—Mn composite oxide with each other to improve charge/discharge cycle characteristics and thermal stability of the Li—Co composite oxide (Patent Document 2); the technique of suspending lithium carbonate, $Ni(OH)_2$, $Co(OH)_2$ and manganese carbonate in a Li—Co composite oxide, or by mechanically treating and coating the Li—Co composite oxide with a Li—Ni—Co—Mn composite oxide to improve charge/discharge cycle characteristics and high-temperature characteristics of the Li—Co composite oxide (Patent Documents 3 and 4); or the like, although these techniques are different in kind of material from those relating to the Li—Ni composite oxide.

Patent Document 1: Japanese Patent Application Laid-open (KOKAI) No. 2004-127694

Patent Document 2: Japanese Patent Application Laid-open (KOKAI) No. 2005-317499

Patent Document 3: Japanese Patent Application Laid-open (KOKAI) No. 2006-331943

Patent Document 4: Japanese Patent Application Laid-open (KOKAI) No. 2007-48711

DISCLOSURE OF THE INVENTION

Problem to be Solved by the Invention

At present, it has been strongly required to provide the Li—Ni composite oxide as a positive electrode active material for a non-aqueous electrolyte secondary battery which is improved in thermal stability under a charged condition. However, the Li—Ni composite oxide capable of fully satisfying the above requirement has not been obtained until now.

Accordingly, an object of the present invention is to provide Li—Ni composite oxide particles as a positive electrode active material for a non-aqueous electrolyte secondary battery which are improved in thermal stability under a charged condition; a process for producing the Li—Ni composite oxide particles; and a non-aqueous electrolyte secondary battery having a positive electrode comprising the Li—Ni composite oxide particles.

Means for Solving the Problem

That is, in accordance with the present invention, in order to achieve the above object, in a non-aqueous electrolyte secondary battery comprising a positive electrode and a negative electrode which is formed from a metallic lithium or a material capable of intercalating and de-intercalating a lithium ion, an active material for the positive electrode comprises Li—Ni composite oxide particles for a non-aqueous electrolyte secondary battery which comprise a Li—Ni composite oxide whose secondary particles form core particles thereof and have a composition represented by the formula:

$$Li_{x1}Ni_{1-y1-z1-w1}Co_{y1}Mn_{z1}M_{w1}O_2$$

(in which $0.9 \le x1 \le 1.3$; $0.1 \le y1 \le 0.3$; $0.0 \le z1 \le 0.3$; $0 \le w1 \le 0.1$; and M is at least one metal selected from the group consisting of Al and Fe), in which a Li—Ni composite oxide having a composition represented by the formula:

$$Li_{x2}Ni_{1-y2-z2-w2}Co_{y2}Mn_{z2}M_{w2}O_2$$

(in which $0.9 \le x2 \le 1+z2$; $0 \le y2 \le 0.33$; $0 \le z2 \le 0.5$; and $0 \le w2 \le 0.1$, with the proviso that $0.5 \le (1-y2-z2-w2)/(y2+z2+w2)$, $0.3 \le (z1+z2)$ and $0 < (z2-z1) \le 0.5$); and M is at least one metal selected from the group consisting of Al, Fe, Mg, Zr and Ti), is coated or present on a surface of the respective secondary particles (Invention 1).

Also, in accordance with the present invention, there are provided the Li—Ni composite oxide particles for a non-aqueous electrolyte secondary battery as described in Invention 1, wherein a weight percentage of the Li—Ni composite oxide which is coated or present on the surface of the respective secondary particles of the Li—Ni composite oxide forming the core particles is not less than 3% and not more than 20% based on the weight of the Li—Ni composite oxide forming the core particles (Invention 2).

Further, in accordance with the present invention, there are provided Li—Ni composite oxide particles for a non-aqueous electrolyte secondary battery, comprising a Li—Ni composite oxide whose secondary particles form core particles thereof and have a composition represented by the formula:

$$Li_{x1}Ni_{1-y1-z1-w1}Co_{y1}Mn_{z1}M_{w1}O_{2-v1}K_{v1}$$

(in which $0.9 \le x1 \le 1.3$; $0.1 \le y1 \le 0.3$; $0.0 \le z1 \le 0.3$; $0 \le w1 < 0.1$; $0 \le v1 \le 0.05$; M is at least one metal selected from the group consisting of Al and Fe; and K is at least one anion selected from the group consisting of $F^-$ and $PO_4^{3-}$), in which a Li—Ni composite oxide having a composition represented by the formula:

$$Li_{x2}Ni_{1-y2-z2-w2}Co_{y2}Mn_{z2}M_{w2}O_{2-v2}K_{v2}$$

(in which $0.9 \le x2 \le 1+z2$; $0 \le y2 \le 0.33$; $0 \le z2 \le 0.5$; $0 \le w2 \le 0.1$; and $0 \le v2 \le 0.05$, with the proviso that $0.5 \le (1-y2-z2-w2)/(y2+z2+w2)$, $0.3 \le (z1+z2)$ and $0 < (z2-z1) \le 0.5$); M is at least one metal selected from the group consisting of Al, Fe, Mg, Zr and Ti; and K is at least one anion selected from the group consisting of $F^-$ and $PO_4^{3-}$), is coated or present on a surface of the respective secondary particles (Invention 3).

In addition, in accordance with the present invention, there are provided Li—Ni composite oxide particles for a non-aqueous electrolyte secondary battery, comprising a Li—Ni composite oxide whose secondary particles form core particles thereof and have a composition represented by the formula:

$$Li_{x1}Ni_{1-y1-z1-w1}Co_{y1}Mn_{z1}M_{w1}O_{2-v1}K_{v1}$$

(in which $1.0 < x1 \le 1.3$; $0.1 \le y1 \le 0.3$; $0.0 \le z1 \le 0.3$; $0 \le w1 < 0.1$; $0 < v1 \le 0.05$; M is at least one metal selected from the group consisting of Al and Fe; and K is at least one anion selected from the group consisting of $F^-$ and $PO_4^{3-}$), in which a composite oxide having a metal mol number of $(x1-1)$ and a composition represented by the formula:

$$Ni_{1-y2-z2-w2}Co_{y2}Mn_{z2}M_{w2}O_{2-v2}K_{v2}$$

(in which $0 \le y2 \le 0.33$; $0 \le z2 \le 0.5$; $0 \le w2 \le 0.1$; and $0 \le v2 \le 0.05$, with the proviso that $0.5 \le (1-y2-z2-w2)/(y2+z2+w2)$, $0.3 \le (z1+z2)$ and $0 < (z2-z1) \le 0.5$; M is at least one metal selected from the group consisting of Al, Fe, Mg, Zr and Ti; and K is at least one anion selected from the group consisting of $F^-$ and $PO_4^{3-}$), is coated or present on a surface of the respective secondary particles (Invention 4).

In addition, in accordance with the present invention, there are provided Li—Ni composite oxide particles for a non-aqueous electrolyte secondary battery as described in any one of the above Inventions, wherein when using a negative electrode formed from a metallic lithium or a material which allows a lithium ion to be intercalated and de-intercalated to the Li—Ni composite oxide forming the core particles, an exothermic maximum peak thereof observed at a temperature ranging from 200 to 290° C. in a differential thermal analysis under a 4.5 V charged condition is shifted by 15° C. or higher towards a high-temperature side (Invention 5).

In addition, in accordance with the present invention, there are provided Li—Ni composite oxide particles for a non-aqueous electrolyte secondary battery as described in any one of the above Inventions, wherein a discharge capacity thereof as measured at a charge/discharge rate of 0.2 mA/cm² in the range of 4.3 to 3.0 V with respect to a negative electrode formed from a metallic lithium or a material which allows a lithium ion to be intercalated and de-intercalated to the Li—Ni composite oxide forming the core particles, is not less than 180 mAh/g (Invention 6).

Also, in accordance with the present invention, there is provided a process for producing the Li—Ni composite oxide particles for a non-aqueous electrolyte secondary battery as described in any one of the above Inventions 1 to 6, comprising:

allowing the Li—Ni composite oxide to be coated or present on a surface of the respective secondary particles of the Li—Ni composite oxide forming the core particles by subjecting these materials to a wet chemical treatment or a dry mechanical treatment, or further to a thermal treatment in an oxygen atmosphere at a temperature of not lower than 250° C. and preferably not lower than 300° C. for 10 min or longer in addition to the wet or dry treatment (Invention 7).

Further, in accordance with the present invention, there is provided a non-aqueous electrolyte secondary battery comprising a positive electrode comprising a positive electrode active material formed from the Li—Ni composite oxide particles for a non-aqueous electrolyte secondary battery as described in any one of the above Inventions 1 to 6 (Invention 8).

EFFECT OF THE INVENTION

Further, in the Li—Ni composite oxide particles according to the present invention, when a Li—Ni—Co—Mn composite oxide is coated or present on the surface of respective secondary particles of the Li—Ni composite oxide forming core particles by subjecting these materials to a wet chemical treatment or a dry mechanical treatment, or to further a thermal treatment in addition to the wet or dry treatment, it is possible to produce Li—Ni-composite particles which can be enhanced in safety under a charged condition while keeping a high capacity.

Therefore, the Li—Ni composite oxide particles according to the present invention are suitable as a positive electrode active material for a non-aqueous electrolyte secondary battery.

PREFERRED EMBODIMENT FOR CARRYING OUT THE INVENTION

Figure 1:
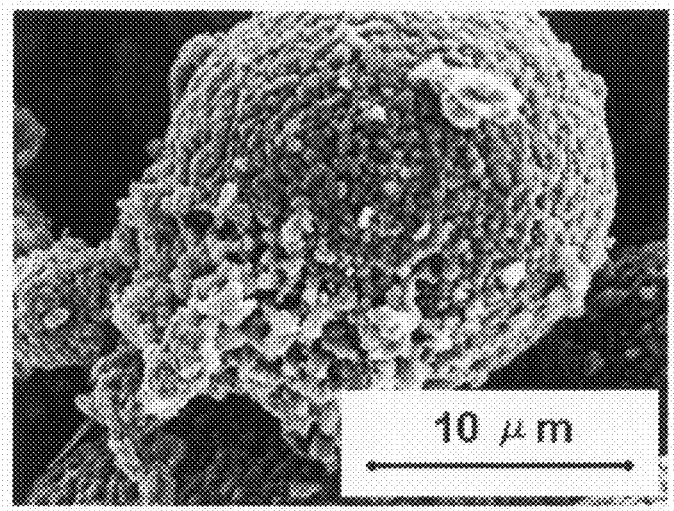
FIG. 1 is a photograph showing a surface condition of the Li—Ni composite oxide particles obtained in Example 1.

The present invention is described in detail below.

First, the Li—Ni composite oxide particles for a non-aqueous electrolyte secondary battery according to the present invention are described.

In the Li—Ni composite oxide particles for a non-aqueous electrolyte secondary battery according to the present invention, particles of a Li—Ni composite oxide having a specific composition are coated or present on the surface of respective secondary particles of a Li—Ni composite oxide having a specific composition which serve as core particles thereof. Meanwhile, the term "coated or present on the surface of the particles" as used herein means not only that the particles of the Li—Ni composite oxide having a specific composition are coated or present on the surface of the respective secondary particles, but also that, for example, when the secondary particles include irregularities or pores, the Li—Ni composite oxide particles are coated on an inside surface thereof which is communicated with an outside, or present in the pores. More specifically, the Li—Ni composite oxide particles according to the present invention are intended to involve not only those obtained by coating the whole surface of the secondary particles as the core particles with the Li—Ni composite oxide particles having a specific composition, but also those obtained by allowing the Li—Ni composite oxide particles having a specific composition to be present or attached in the vicinity of the surface of the secondary particles as the core particles or onto a part of the surface thereof.

The Li—Ni composite oxide forming the core particles preferably has a composition represented by the formula:

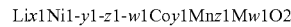

Li$_{x1}$Ni$_{1-y1-z1-w1}$Co$_{y1}$Mn$_{z1}$M$_{w1}$O$_2$ (in which 0.9≤x1≤1.3; 0.1≤y1≤0.3; 0.0≤z1≤0.3; 0≤w1≤0.1; and M is at least one metal selected from the group consisting of Al and Fe).

When the composition of the Li—Ni composite oxide forming the core particles is out of the above-specified range, it may be difficult to attain a high discharge capacity as a feature of the Li—Ni composite oxide.

The particles which are coated or present on the core particles have a composition represented by the formula;

Li$_{x2}$Ni$_{1-y2-z2-w2}$Co$_{y2}$Mn$_{z2}$M$_{w2}$O$_2$ (in which 0.9≤x2≤1+z; 0≤y2≤0.33 (⅓); 0≤z2≤0.5; 0≤w2≤0.1; and m is at least one metal selected from the group consisting of Al, Fe, mg, Zr and Ti).

When the composition of the particles which are coated or present on the core particles is out of the above-specified range, the obtained composite oxide particles tend to be deteriorated in thermal stability under a charged condition, and the resulting crystals tend to hardly maintain a layer rock-salt structure, so that an intercalation reaction associated with charge/discharge of Li ions in the secondary particles as the core particles tends to be inhibited.

According to the present invention, in the compositions of the secondary particles forming the core particles and the Li—Ni composite oxide which is coated or present on the core particles, the relationships represented by the formula: 0.5≤(1−y2−z2−w2)/(y2+z2+w2); 0.3≤(z1+z2); and 0<(z2−z1)≤0.5, are satisfied.

When the value of (1−y2−z2−w2)/(y2+z2+w2) is less than 0.5, it may be difficult to improve a thermal stability of the resulting particles under a charged condition. The value of (1−y2−z2−w2)/(y2+z2+w2) is more preferably 0.51 to 1.5.

When the value of (z1+z2) is less than 0.3, it may be difficult to improve a thermal stability of the resulting particles under a 4.5 V charged condition while keeping a high capacity. The value of (z1+z2) is more preferably 0.32 to 0.60.

When the value of (z2−z1) is more than 0.5, the Mn element content in the coating particles tends to be increased, and the resulting crystals tend to hardly maintain a layer rock-salt structure, so that an intercalation reaction associated with charge/discharge of Li ions in the secondary particles as the core particles tends to be inhibited, resulting in deterioration of initial discharge capacity of the resulting particles. The value of (z2−z1) is more preferably 0.20 to 0.45.

The content of the Li—Ni composite oxide which is coated or present on the secondary particles of the Li—Ni composite oxide forming the core particles is preferably not less than 3% by weight and not more than 20% by weight based on the weight of the core particles.

When the content of the Li—Ni composite oxide which is coated or present on the core particles is less than 3% by weight, the resulting particles tend to be deteriorated in thermal stability under a charged condition although they maintain a high discharge capacity. When the content of the Li—Ni composite oxide which is coated or present on the core particles is more than 20% by weight, the resulting particles tend to be deteriorated in discharge capacity although they are improved in thermal stability under a charged condition. The content of the Li—Ni composite oxide which is coated or present on the core particles is more preferably 3.0 to 18% by weight.

In addition, the ratio of a content of Ni element in the Li—Ni composite oxide which is coated or present on the core particles to a content of Ni element in the secondary particles of the Li—Ni composite oxide forming the core particles preferably lies within the range represented by the formula: (1−y2−z2−w2)/(1−y1−z1−w1)≤1. When the ratio between the Ni element contents in the secondary particles of the Li—Ni composite oxide forming the core particles and the particles which are coated or present on the core particles is out of the above-specified range, the resulting particles tend to be deteriorated in thermal stability under a charged condition.

In addition, in accordance with the present invention, the secondary particles forming the core particles may also have a composition represented by the formula:

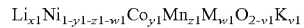

Li$_{x1}$Ni$_{1-y1-z1-w1}$Co$_{y1}$Mn$_{z1}$M$_{w1}$O$_{2-v1}$K$_{v1}$ (in which 0.9≤x1≤1.3; 0.1≤y1≤0.3; 0.0≤z1≤0.3; 0≤w1<0.1; 0≤v1≤0.05; M is at least one metal selected from the group consisting of Al and Fe; and K is at least one anion selected from the group consisting of F$^-$ and PO$_4^{3-}$) (Invention 3).

Further, the particles of the Li—Ni composite oxide which are coated or present on the core particles may also have a composition represented by the formula:

$$Li_{x2}Ni_{1-y2-z2-w2}Co_{y2}Mn_{z2}M_{w2}O_{2-v2}K_{v2}$$

(in which $0.9 \leq x2 \leq 1+z2$; $0 \leq y2 \leq 0.33$; $0 \leq z2 \leq 0.5$; $0 \leq w2 \leq 0.1$; and $0 \leq v2 \leq 0.05$, with the proviso that $0.5 \leq (1-y2-z2-w2)/(y2+z2+w2)$, $0.3 \leq (z1+z2)$ and $0 < (z2-z1) \leq 0.5$); M is at least one metal selected from the group consisting of Al, Fe, Mg, Zr and Ti; and K is at least one anion selected from the group consisting of F— and PO43-) (Invention 3).

When $F^-$ or $PO_4^{3-}$ is present in the particles which are coated or present on the core particles, both the core particles and the particles which are coated or present on the core particles can be enhanced in thermal stability under a charged condition, so that the resulting Li—Ni composite oxide particles can be further improved in thermal stability under a charged condition.

When the content of K in the compositions is out of the above-specified range, the resulting Li—Ni composite oxide particles tend to be deteriorated in discharge capacity.

Further, in accordance with the present invention, the secondary particles of the Li—Ni composite oxide forming the core particles may also have a composition represented by the formula:

$$Li_{x1}Ni_{1-y1-z1-w1}Co_{y1}Mn_{z1}M_{w1}O_{2-v1}K_{v1}$$

(in which $1.0 < x1 \leq 1.3$; $0.1 \leq y1 \leq 0.3$; $0.0 \leq z1 \leq 0.3$; $0 \leq w1 < 0.1$; $0 \leq v1 \leq 0.05$; M is at least one metal selected from the group consisting of Al and Fe; and K is at least one anion selected from the group consisting of $F^-$ and $PO_4^{3-}$).

In addition, a composite oxide having a metal mol number of (x1–1) and a composition represented by the formula;

$$Li_{x2}Ni_{1-y2-z2-w2}Co_{y2}Mn_{z2}M_{w2}O_{2-v2}K_{v2}$$

(in which $0 \leq y2 \leq 0.33$; $0 \leq z2 \leq 0.5$; $0 \leq w2 \leq 0.1$; and $0 \leq v2 \leq 0.05$, with the proviso that $0.5 \leq (1-y2-z2-w2)/(y2+z2-w2)$, $0.3 \leq (z1+z2)$ and $0 < (z2-z1) \leq 0.5$; M is at least one metal selected from the group consisting of Al, Fe, Mg, Zr and Ti; and K is at least one anion selected from the group consisting of F" and $PO_4^{3-}$), may be coated or present on a surface of the respective secondary particles (Invention 4).

When controlling the composition of the particles which are coated or present on the surface of the respective Secondary particles as described above, an excessive amount of lithium being present on the surface of the secondary particles forming the core particles is reacted with the particles which are coated or present on the surface of the respective secondary particles during the heat treatment, so that an alkalinity of the Li—Ni composite oxide can be reduced. As a result, it is possible to further suppress gelation of an electrode slurry and occurrence of gases under high temperature.

The average secondary particle diameter of the secondary particles forming the core particles is preferably 5 to 20 μm. When the average secondary particle diameter is less than 5 μm, the resulting particles tend to exhibit a low electrode packing density and a large BET specific surface area, resulting in high reactivity with an electrolyte solution and, therefore, deteriorated thermal stability under a charged condition. When the average secondary particle diameter is more than 20 μm, the resulting battery tends to suffer from increase in resistance within electrode owing to increase in thickness of the electrode and, therefore, deterioration in charge/discharge rate characteristics thereof. The average secondary particle diameter of the secondary particles forming the core particles is more preferably 8 to 18 μm.

The average primary particle diameter of the core particles is 0.5 to 1.5 μm. The core particles necessarily have such an average primary particle diameter at a temperature generally used for calcination of the particles.

The average primary particle diameter of the particles which are coated or present on the core particles is 0.1 to 3.0 μm. The particles necessarily have such an average primary particle diameter at a temperature generally used for calcination of the particles.

The average secondary particle diameter of the Li—Ni composite oxide particles for a non-aqueous electrolyte secondary battery according to the present invention is preferably 5 to 20 μm. When the average secondary particle diameter of the Li—Ni composite oxide particles is less than 5 μm, the Li—Ni composite oxide particles tend to suffer from not only decrease in electrode packing density, but also increase in reactivity with an electrolyte solution owing to increase in BET specific surface area thereof, resulting in deteriorated thermal stability under a charged condition. When the average particle diameter of the Li—Ni composite oxide particles is more than 20 μm, the resulting cell tends to suffer from increase in resistance within electrode owing to increase in thickness of the electrode and, therefore, deterioration in charge/discharge rate characteristics thereof.

In the Li—Ni composite oxide particles for a non-aqueous electrolyte secondary battery according to the present invention, when using a negative electrode formed from a metallic lithium or a material capable of intercalating and de-intercalating a lithium ion, an exothermic maximum peak thereof observed at a temperature ranging from 200 to 290° C. in a differential thermal analysis under a 4.5 v charged condition is preferably increased by 15° C. or higher, more preferably 20° C. or higher and still more preferably 30° C. or higher as compared to that of the secondary particles of the Li—Ni composite oxide forming the core particles (i.e., shifted toward a high-temperature side).

Next, the process for producing the Li—Ni composite oxide particles for a non-aqueous electrolyte secondary battery according to the present invention is described.

Upon producing the Li—Ni composite oxide particles according to the present invention, the Li—Ni composite oxide forming the core particles and the Li—Ni composite oxide which is to be coated or present on the surface of the respective core particles are subjected to a wet chemical treatment or a dry mechanical treatment, and further to a thermal treatment in an oxygen atmosphere at a temperature of not lower than 250° C. and preferably not lower than 300° C. for 10 min or longer, if required, to thereby allow the Li—Ni composite oxide particles to be coated or present on the surface of the respective secondary particles of the Li—Ni composite oxide forming the core particles.

The Li—Ni composite oxide forming the core particles as well as the Li—Ni composite oxide as the particles which are to be coated or present on the surface of the respective core particles may be produced by ordinary methods. For example, these Li—Ni composite oxides may be produced by mixing the composite oxides with a lithium salt by a solid phase method or a wet method, and then calcining the resulting mixture in an atmosphere of oxygen or air at a temperature of 650 to 1000° C.

Also, when allowing $F^-$ and $PO_4^{3-}$ to be present in the Li—Ni composite oxide particles as in Invention 3 or 4, when mixing the composite hydroxide used for producing the Li—Ni composite oxide forming the core particles and the Li—Ni composite oxide as the particles which are to be coated or present on a surface of the respective core particles, with a lithium salt by a dry or wet method, a predetermined amount of LiF or $Li_3PO_4$ may be added to the mixture.

The method of forming the composite particles comprising the secondary particles forming the core particles and the particles which are coated or present on the surface of the respective secondary particles, is not particularly limited, and may be performed by a wet chemical treatment or a dry mechanical treatment. For example, in the wet chemical treatment, the composite particles may be produced by the method of suspending the particles forming the core particles in an acid solution comprising elements forming the particles which are coated or present on the core particles, and then subjecting the resultant suspension to neutralization and then to thermal treatment, or the method of suspending the particles which are to be coated or present on the core particles together with the particles forming the core particles in pure water or an organic solvent, and then subjecting the resultant suspension to thermal treatment. In the mechanical treatment, the secondary particles forming the core particles and the particles which are coated or present on the core particles may be forced into a given clearance while applying a compression shear force thereto to form composite particles thereof.

Next, the positive electrode using the positive electrode active material comprising the Li—Ni composite oxide particles according to the present invention is described.

When producing the positive electrode using the positive electrode active material according to the present invention, a conducting agent and a binder are added to the positive electrode active material by an ordinary method. Examples of the preferred conducting agent include acetylene black, carbon black and graphite. Examples of the preferred binder include polytetrafluoroethylene and polyvinylidene fluoride.

The secondary battery produced by using the positive electrode active material according to the present invention comprises the above positive electrode, a negative electrode and an electrolyte.

Examples of a negative electrode active material which may be used for the negative electrode include metallic lithium, lithium/aluminum alloy, lithium/tin alloy, graphite and black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving lithium phosphate hexafluoride as well as at least one lithium salt selected from the group consisting of lithium perchlorate and lithium borate tetrafluoride in the above solvent.

The secondary battery produced by using the positive electrode active material according to the present invention has an initial discharge capacity of not less than 180 mAh/g, and exhibits such an excellent thermal stability that an exothermic maximum peak thereof observed at a temperature ranging from 200 to 290° C. in a differential thermal analysis under a 4.5 V charged condition is shifted by 15° C. or higher towards a high-temperature side, The temperature by which the exothermic maximum peak is shifted towards a high-temperature is preferably 30° C. or higher and more preferably as high as possible.

<Function>

One of reasons for the lack of thermal stability of the non-aqueous electrolyte secondary battery is that the cell has a low oxygen desorption temperature. The low oxygen desorption temperature tends to be caused due to desorption of oxygen from the surface of the electrode owing to unstable structure of the battery under a charged condition.

In order to avoid the above problem, it is important to modify the surface of the positive electrode active material used for the non-aqueous electrolyte secondary battery. Various methods for modifying the surface of the positive electrode active material have been proposed in the prior arts (Patent Documents 1 to 4), etc. However, in Patent Document 1, the core particles has a composition of a Li—Ni—Al composite oxide and, therefore, tends to be deteriorated in charge/discharge efficiency. Further, in Patent Document 1, since there are no descriptions concerning the coating condition and coating ratios, it is unclear whether or not the coating is effective to improve a thermal stability of the particles. Also, in Patent Document 2, a Li—Co composite oxide and a Li—Ni—Co—Mn composite oxide are mixed with each other to improve a thermal stability thereof. Therefore, in Patent Document 2, it is not possible to attain a high discharge capacity. In addition, in Patent Document 3, a Li—Co composite oxide is surface-coated with a Li—Ni—Co—Mn composite oxide, and in Patent Document 4, a coating layer comprising metallic lithium, nickel, cobalt and manganese is formed on the surface of a Co composite oxide, to attain a high capacity and improve cycle characteristics and high-temperature storage characteristics thereof. However, these conventional techniques have failed to achieve a high discharge capacity similar to that of the Li—Ni composite oxide.

Thus, according to the present invention, in a Li—Ni composite oxide whose secondary particles form core particles and have a composition represented by the formula:

$$Li_{x1}Ni_{1-y1-z1-w1}Co_{y1}Mn_{z1}M_{w1}O_2$$

(in which 0.9≤x1≤1.3; 0.1≤y1≤0.3; 0.0≤z1≤0.3; 0≤w1≤0.1; and M is at least one metal selected from the group consisting of Al and Fe), when a Li—Ni composite oxide having a composition represented by the formula:

$$Li_{x2}Ni_{1-y2-z2-w2}Co_{y2}Mn_{z2}M_{w2}O_2$$

(in which 0.9≤x2≤1+z2; 0≤y2≤0.33; 0≤z2≤0.5; and 0≤w2≤0.1, with the proviso that 0.5≤(1−y2−z2−w2)/(y2+z2+w2), 0.3≤(z1+z2) and 0<(z2−z1)≤0.5; and M is at least one metal selected from the group consisting of Al, Fe, Mg, Zr and Ti, is coated or present on or in the vicinity of a surface of the respective secondary particles, the resulting composite particles can be improved in oxygen desorption temperature under a charged condition as well as thermal under a charged condition.

In addition, according to the present invention, in Li—Ni composite oxide whose secondary particles form core particles and have a composition represented by the formula;

$$Li_{x1}Ni_{1-y1-z1-w1}Co_{y1}Mn_{z1}M_{w1}O_{2-v1}K_{v1}$$

(in which 0.9≤x1≤1.3; 0.1≤y1≤0.3; 0.0≤z1≤0.3; 0≤w1<0.1; 0≤v1≤0.05; M is at least one metal selected from the group consisting of Al and Fe; and K is at least one anion selected from the group consisting of $F^-$ and $PO_4^{3-}$), when a Li—Ni composite oxide having a composition represented by the formula:

$$Li_{x2}Ni_{1-y2-z2-w2}Co_{y2}Mn_{z2}M_{w2}O_{2-v2}K_{v2}$$

(in which 0.9≤x2≤1+0≤y2≤0.33; 0≤z2≤0.5; 0≤w2≤0.1; and 0≤v2≤0.05, with the proviso that 0.5≤(1−y2−z2−w2)/(y2+z2+w2), 0.3≤(z1−z2) and 0<(z2−z1)≤0.5; M is at least one metal selected from the group consisting of Al, Fe, Mg, Zr and Ti; and K is at least one anion selected from the group consisting of $F^-$ and $PO_4^{3-}$), is coated or present on a surface of the respective secondary particles, the resulting composite particles can be improved in oxygen desorption temperature under a charged condition as well as thermal stability under a charged condition.

Further, in the Li—Ni composite oxide particles according to the present invention, when a weight percentage of the Li—Ni composite oxide which is coated or present on the surface of the respective secondary particles of the Li—Ni composite oxide forming the core particles is controlled to not less than 3% and not more than 20% based on the weight of the Li—Ni composite oxide forming the core particles, the resulting composite particles can be enhanced in thermal stability while keeping a high discharge capacity.

In addition, in the Li—Ni composite oxide particles according to the present invention, when allowing the Li—Ni composite oxide to be coated or present on the surface of the respective secondary particles of the Li—Ni composite oxide forming the core particles by subjecting these materials to a wet chemical treatment or a dry mechanical treatment, or further to a thermal treatment in addition to the wet or dry treatment, an exothermic maximum peak thereof observed at a temperature ranging from 200 to 290° C. in a differential thermal analysis under a 4.5 V charged condition is shifted by 15° C. or higher towards a high-temperature side, so that the resulting composite particles can be improved in safety under a charged condition.

EXAMPLES

Typical embodiments of the present invention are described in more detail below.

The average particle diameter is a volume-average particle diameter as measured by a wet laser method using a laser type particle size distribution measuring apparatus "LMS-30" manufactured by Seishin Kigyo Co., Ltd.

The condition of existence of the particles which are allowed to be coated or present on the core particles was observed using a scanning electron microscope "SEM-EDX" equipped with an energy disperse type X-ray analyzer (manufactured by Hitachi High-Technologies Corp.).

The average primary particle diameter of the particles which are coated or present on the core particles was observed and determined using a scanning electron microscope "SEM-EDX" equipped with an energy disperse type X-ray analyzer (manufactured by Hitachi High-Technologies Corp.).

The coin cell produced by using the Li—Ni composite oxide particles was evaluated for initial charge/discharge characteristics and storage characteristics under a high temperature condition.

First, 90% by weight of the composite oxide as a positive electrode active material, 3% by weight of acetylene black and 3% by weight of a graphite "KS-16" both serving as a conducting material, and 4% by weight of polyvinylidene fluoride dissolved in N-methylpyrrolidone as a binder, were mixed with each other, and the resulting mixture was applied onto an Al metal foil and then dried at 150° C. The thus obtained sheets were blanked into 160 cmϕ and then compression-bonded to each other under a pressure of 1 t/cm², thereby producing an electrode having a thickness of 50 μm and using the thus produced electrode as a positive electrode. A metallic lithium blanked into 160 cmϕ was used as a negative electrode, and a solution prepared by mixing EC and DMC each comprising 1 mol/L of $LiPF_6$ dissolved therein with each other at a volume ratio of 1:2 was used as an electrolyte solution, thereby producing a coin cell of a CR2032 type.

The initial charge/discharge characteristics of the cell were determined as follows. That is, under a room temperature condition, the cell was charged at rate of 0.2 mA/cm² until reaching 4.3 V and then discharged at a rate of 0.2 mA/cm² until reaching 3.0 V to measure an initial charge capacity, an initial discharge capacity and an initial efficiency of the cell.

The evaluation for safety of the Li—Ni composite oxide particles was carried out as follows. That is, the coin cell of a CR2032 type was produced in the same manner as in the evaluation for initial charge/discharge characteristics, and subjected to initial charge/discharge cycle. Then, the cell was subjected to the second charging at such a current as to complete charging of the cell up to 4.5 V for 10 hr. The coin cell was disassembled while being kept under the above charged state to remove the positive electrode therefrom. The positive electrode thus removed was put into an Al pressure cell and sealed under the co-existence of the electrolyte solution, and then subjected to differential thermal analysis over the range of from room temperature to 400° C. at a scanning speed of 5'C/min.

Example 1

An aqueous solution prepared by mixing 2 mol/L of nickel sulfate with cobalt sulfate at a mixing ratio of Ni:Co=84:16, and a 5.0 mol/L ammonia aqueous solution were simultaneously fed to a reaction vessel. The contents of the reaction vessel were always kept stirred by a blade-type stirrer and, at the same time, the reaction vessel was automatically supplied with a 2 mol/L sodium hydroxide aqueous solution so as to control the pH of the contents in the reaction vessel to 11.5±0.5. The Ni—Co hydroxide produced in the reaction vessel was overflowed therefrom through an overflow pipe, and collected in a concentration vessel connected to the overflow pipe to concentrate the Ni—Co hydroxide. The concentrated Ni—Co hydroxide was circulated to the reaction vessel, and the reaction was continued for 40 hr until the concentration of the Ni—Co hydroxide in the reaction vessel and a precipitation vessel reached 4 mol/L.

After completion of the reaction, the resulting suspension was withdrawn from the reaction vessel, and washed with water in an amount of 5 times the amount of the suspension using a filter press, and further subjected to deaggregation to adjust a concentration of the Ni—Co hydroxide in the suspension to 0.2 mol/L. A 0.2 mol/L sodium aluminate aqueous solution was continuously fed to the suspension in the reaction vessel such that a molar ratio of (Ni+Co):Al in the resulting mixture was 95:5. The contents of the reaction vessel were always kept stirred by the stirrer and, at the same time, a 0.2 mol/L sulfuric acid aqueous solution was automatically supplied thereto so as to control the pH of the contents of the reaction vessel to 10.5±0.5, thereby obtaining a suspension comprising the Ni—Co hydroxide coated with aluminum hydroxide.

The resulting suspension was washed with water in an amount of 10 times the weight of the Ni—Co hydroxide in the suspension using a filter press, and then dried, thereby obtaining the Ni—Co hydroxide particles coated with aluminum hydroxide which had a molar ratio of Ni:Co:Al=80:15:5 and an average secondary particle diameter of 14.5 μm. The resulting Al-coated Ni—Co hydroxide particles were mixed with lithium hydroxide monohydrate whose particle size was previously controlled by a crusher, such that a molar ratio of Li/(Ni+Co+Al) in the resulting mixture was 1.02.

The resulting mixture was calcined in an oxygen atmosphere at 750° C. for 10 hr, and then deaggregated and pulverized. As a result of ICP analysis, it was confirmed that the obtained calcined product had a chemical composition of $Li_{1.02}Ni_{0.8}Co_{0.15}Al_{0.05}O_2$ and an average particle diameter of 14.5 μm. The thus obtained Li—Ni composite oxide was used as secondary particles forming core particles.

Next, an aqueous solution prepared by mixing 2 mol/L of nickel sulfate with cobalt sulfate and manganese sulfate such that a molar ratio of Ni:Co:Mn in the resulting mixture was 1/3:1/3:1/3, and a 5.0 mol/L ammonia aqueous solution were simultaneously fed into the reaction vessel.

The contents of the reaction vessel were always kept stirred by a blade-type stirrer and, at the same time, the reaction vessel was automatically supplied with a 2 mol/L sodium hydroxide aqueous solution so as to control the pH of the contents in the reaction vessel to 11.5±0.5. The Ni—Co—Mn hydroxide produced in the reaction vessel was overflowed therefrom through an overflow pipe, and collected in a concentration vessel connected to the overflow pipe to concentrate the Ni—Co—Mn hydroxide. The concentrated Ni—Co—Mn hydroxide was circulated to the reaction vessel, and the reaction was continued for 40 hr until the concentration of the Ni—Co—Mn hydroxide in the reaction vessel and a precipitation vessel reached 4 mol/L.

The resulting suspension was washed with water in an amount of 10 times the weight of the Ni—Co—Mn hydroxide in the suspension using a filter press, and then dried, thereby obtaining the Ni—Co—Mn hydroxide particles having a molar ratio of Ni:Co:Mn=1/3:1/3:1/3.

The resulting Ni—Co—Mn hydroxide particles were mixed with lithium carbonate whose particle size was previously controlled by a crusher such that a molar ratio of Li/(Ni+Co+Mn) in the resulting mixture was 1.05.

The resulting mixture was calcined in an atmospheric air at 950° C. for 5 hr, and then deaggregated and pulverized in pure water until a weight percentage thereof reached 30%. The obtained mixture was pulverized using a wet ball mill for 1 hr, and then dried. As a result of ICP analysis, it was confirmed that the obtained calcined product had a chemical composition of $Li_{1.05}Ni_{1/3}Co_{1/3}Mn_{1/3}O_2$ and an average particle diameter of 0.5 μm.

The thus obtained $Li_{1.05}Ni_{1/3}Cu_{1/3}Mn_{1/3}O_2$ was mixed with the $Li_{1.02}Ni_{0.8}Cu_{0.15}Al_{0.05}O_2$ forming the core particles such that an amount of the former composite oxide was 3% by weight based on the weight of the latter composite oxide, and the resulting mixture was subjected to mechanical treatment using a mechanical crusher for 30 min, and then calcined again in an oxygen atmosphere at 750° C. for 5 hr, thereby obtaining Li—Ni composite oxide particles comprising secondary particles of $Li_{1.02}Ni_{0.8}Cu_{0.15}Al_{0.05}O_2$ forming the core particles whose surface was coated with 3% by weight of $Li_{1.05}Ni_{1/3}Co_{1/3}Mn_{1/3}O_2$. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 276° C. Also, it was confirmed that the obtained Li—Ni composite particles had a discharge capacity of 183 mAh/g.

Example 2

The same procedure as defined in Example 1 was conducted except that in order to produce the Li—Ni composite oxide having a composition of $Li_{1.05}Ni_{0.45}Cu_{0.2}Mn_{0.3}Al_{0.05}O_2$ which was to be coated or present on the core particles, a solution prepared by mixing nickel sulfate, cobalt sulfate and manganese sulfate as raw materials of Ni composite hydroxide with each other such that a molar ratio of Ni:Co:Mn was 47.3:21.1:31.5, was used to coat the core particles with aluminum hydroxide such that the coating had a composition of $Ni_{0.45}Cu_{0.2}Mn_{0.3}Al_{0.05}(OH)_2$, thereby obtaining Li—Ni composite oxide particles comprising secondary particles of $Li_{1.02}Ni_{0.8}Co_{0.15}Al_{0.05}O_2$ forming the core particles which had an average secondary particle diameter of 14.5 μm and whose surface was coated with 3% by weight of $Li_{1.05}Ni_{0.45}Co_{0.2}Mn_{0.3}Al_{0.05}O_2$ having an average primary particle diameter of 0.5 μm. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 261° C. Also, it was confirmed that the obtained Li—Ni composite particles had a discharge capacity of 184 mAh/g.

Example 3

The same procedure as defined in Example 1 was conducted except that in order to produce the Li—Ni composite oxide having a composition of $Li_{1.05}Ni_{0.55}Co_{0.1}Mn_{0.3}Mg_{0.05}O_2$ which was to be coated or present on the core particles, a solution prepared by mixing nickel sulfate, cobalt sulfate and manganese sulfate as raw materials of Ni composite hydroxide with each other such that a molar ratio of Ni:Co:Mn was 57.9:10.5:31.6, was used to coat the core particles with magnesium hydroxide such that the coating had a composition of $Ni_{0.55}Co_{0.1}Mn_{0.3}Mg_{0.05}(OH)_2$, thereby obtaining Li—Ni composite oxide particles comprising secondary particles of $Li_{1.02}Ni_{0.8}Co_{0.15}Al_{0.05}O_2$ forming the core particles which had an average secondary particle diameter of 14.5 μm and whose surface was coated with 3% by weight of $Li_{1.05}Ni_{0.55}Co_{0.1}Mn_{0.3}Mg_{0.05}O_2$ having an average primary particle diameter of 0.5 μm. At this time it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 v charged condition, it was confirmed that an exothermic maximum peak temperature thereof was 256° C. Also, it was confirmed that the obtained Li—Ni composite particles had a discharge capacity of 185 mAh/g.

Example 4

The same procedure as defined in Example 1 was conducted except that in order to produce the Li—Ni composite oxide having a composition of $Li_{1.05}Ni_{0.5}Mn_{0.5}O_2$ which was to be coated or present on the core particles, there was used a solution prepared by mixing nickel sulfate and manganese sulfate as raw materials of Ni composite hydroxide with each other such that a molar ratio of Ni:Mn was 50:50, thereby obtaining Li—Ni composite oxide particles comprising secondary particles of $Li_{1.02}Ni_{0.8}Co_{0.15}Al_{0.05}O_2$ forming the core particles which had an average secondary particle diameter of 14.5 μm and whose surface was coated with 3% by weight of $Li_{1.05}Ni_{0.5}Mn_{0.5}O_2$ having an average primary particle diameter of 0.5 μm. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 280° C. Also, it was confirmed that the obtained Li—Ni composite particles had a discharge capacity of 180 mAh/g.

Example 5

The same procedure as defined in Example 1 was conducted except that in order to produce the Li—Ni composite oxide having a composition of $Li_{1.05}Ni_{0.5}Co_{0.2}Mn_{0.3}O_2$ which was to be coated or present on the core particles, there was used a solution prepared by mixing nickel sulfate, cobalt sulfate and manganese sulfate as raw materials of Ni composite hydroxide with each other such that a molar ratio of Ni:Co:Mn was 50:20:30, the time of pulverization using a wet ball mill was controlled to 15 min, and the average primary particle diameter was adjusted to 2.0 µm, thereby obtaining Li—Ni composite oxide particles comprising secondary particles of $Li_{1.02}Ni_{0.8}Co_{0.15}Al_{0.05}O_2$ forming the core particles which had an average secondary particle diameter of 14.5 µm and whose surface was coated with 3% by weight of $Li_{1.05}Ni_{0.5}Co_{0.2}Mn_{0.3}O_2$ having an average primary particle diameter of 2 µm. At this time, it was confirmed that the average primary particle diameter of the particles which were coated or present on the core particles was 4/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 273° C. Also, it was confirmed that the obtained Li—Ni composite particles had a discharge capacity of 184 mAh/g.

Example 6

The same procedure as defined in Example 1 was conducted except that the coating amount of $Li_{1.05}Ni_{1/3}Co_{1/3}Mn_{1/3}O_2$ which was to be coated or present on the core particles, was adjusted to 15% by weight, thereby obtaining Li—Ni composite oxide particles comprising secondary particles of $Li_{1.02}Ni_{0.8}Co_{0.15}Al_{0.05}O_2$ forming the core particles which had an average secondary particle diameter of 14.5 µm and whose surface was coated with 15% by weight of $Li_{1.05}Ni_{1/3}Co_{1/3}Mn_{1/3}O_2$ having an average primary particle diameter of 0.5 µm. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 282° C. Also, it was confirmed that the obtained Li—Ni composite particles had a discharge capacity of 182 mAh/g.

Example 7

The same procedure as defined in Example 1 was conducted except that no aluminum hydroxide was coated so as to obtain the Li—Ni composite forming the core particles which had a composition of $Li_{1.05}Ni_{0.8}Co_{0.2}O_2$, thereby obtaining Li—Ni composite oxide particles comprising secondary particles of $Li_{1.02}Ni_{0.8}Co_{0.2}O_2$ forming the core particles which had an average secondary particle diameter of 14.5 µm and whose surface was coated with 3% by weight of $Li_{1.05}Ni_{1/3}Co_{1/3}Mn_{1/3}O_2$ having an average primary particle diameter of 0.5 µm. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 265° C. Also, it was confirmed that the obtained Li—Ni composite particles had a discharge capacity of 185 mAh/g.

Example 8

The same procedure as defined in Example 1 was conducted except that in order to produce the Li—Ni composite oxide forming the core particles which had a composition of $L_{1.05}Ni_{0.8}Co_{0.15}Mn_{0.05}O_2$, there was used a solution prepared by mixing nickel sulfate, cobalt sulfate and manganese sulfate as raw materials of Ni composite hydroxide with each other such that a molar ratio of Ni:Co:Mn was 80:15:5, and the reaction time was controlled to 30 hr to adjust the average secondary particle diameter to 10 µm, thereby obtaining Li—Ni composite oxide particles comprising secondary particles of $Li_{1.02}Ni_{0.8}Co_{0.15}Mn_{0.05}O_2$ forming the core particles which had an average secondary particle diameter of 10 µm and whose surface was coated with 3% by weight of $Li_{1.05}Ni_{1/3}Co_{1/3}Mn_{1/3}O_2$ having an average primary particle diameter of 0.5 µm. At this time, it was confirmed that the average primary particle diameter of the particles which were coated or present on the core particles was 1/20 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 267° C. Also, it was confirmed that the obtained Li—Ni composite particles had a discharge capacity of 182 mAh/g.

Example 9

The same procedure as defined in Example 1 was conducted except that the Ni composite hydroxide and LiF were simultaneously mixed with lithium carbonate in order to produce the Li—Ni composite oxide having a composition of $Li_{1.5}Ni_{1/3}Co_{1/3}Mn_{1/3}O_{1.99}F_{0.01}$ which was to be coated or present on the core particles, thereby obtaining Li—Ni composite oxide particles comprising secondary particles of $Li_{1.02}Ni_{0.8}Co_{0.15}Al_{0.05}O_2$ forming the core particles which had an average secondary particle diameter of 14.5 µm and whose surface was coated with 3% by weight of $Li_{1.05}Ni_{1/3}Co_{1/3}Mn_{1/3}O_{1.99}F_{0.01}$ having an average primary particle diameter of 0.5 µm. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 281° C. Also, it was confirmed that the obtained Li—Ni composite particles had a discharge capacity of 182 mAh/g.

Example 10

The same procedure as defined in Example 1 was conducted except that in order to produce the Li—Ni composite oxide forming, the core particles which had a composition of $Li_{1.05}Ni_{0.8}Co_{0.15}Al_{0.05}O_{1.99}F_{0.01}$, the Ni composite hydroxide and LiF were simultaneously mixed with lithium hydroxide, thereby obtaining Li—Ni composite oxide particles comprising secondary particles of $Li_{1.02}Ni_{0.8}Co_{0.15}Al_{0.05}O_{1.99}F_{0.01}$ forming the core particles which had an average secondary particle diameter of 14.5 μm and whose surface was coated with 3% by weight of $Li_{1.05}Ni_{1/3}Co_{1/3}Mn_{1/3}O_2$ having an average primary particle diameter of 0.5 μm. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 276° C. Also, it was confirmed that the obtained Li—Ni composite particles had a discharge capacity of 183 mAh/g.

Example 11

The same procedure as defined in Example 1 was conducted except that the Ni composite hydroxide and LiF were simultaneously mixed with lithium hydroxide in order to produce the Li—Ni composite oxide forming the core particles which had a composition of $Li_{1.05}Ni_{0.8}Co_{0.15}Al_{0.05}O_{1.99}F_{0.01}$, and further the Ni composite hydroxide and LiF were simultaneously mixed with lithium carbonate in order to produce the Li—Ni composite oxide having a composition of $Li_{1.05}Ni_{1/3}Co_{1/3}Mn_{1/3}O_{1.99}F_{0.01}$ which was to be coated or present on the core particles, thereby obtaining Li—Ni composite oxide particles comprising secondary particles of $Li_{1.02}Ni_{0.8}Co_{0.15}Al_{0.05}O_{1.99}F_{0.01}$ forming the core particles which had an average secondary particle diameter of 14.5 μm and whose surface was coated with 3% by weight of $Li_{1.05}Ni_{1/3}Co_{1/3}Mn_{1.3}O_{1.99}F_{0.01}$ having an average primary particle diameter of 0.5 μm. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 284° C. Also, it was confirmed that the obtained Li—Ni composite particles had a discharge capacity of 181 mAh/g.

Comparative Example 1

The same procedure as defined in Example 1 was conducted except that in order to produce the Li—Ni composite oxide having a composition of $Li_{1.05}Ni_{0.7}Co_{0.2}Mn_{1.1}O_2$ which was to be coated or present on the core particles, there was used a solution prepared by mixing nickel sulfate, cobalt sulfate and manganese sulfate as raw materials of coating Ni composite hydroxide with each other such that a molar ratio of Ni:Co:Mn was 70:20:10, thereby obtaining Li—Ni composite oxide particles comprising secondary particles of $Li_{1.02}Ni_{0.8}Co_{0.15}Al_{0.05}O_2$ forming the core particles which had an average secondary particle diameter of 14.5 μm and whose surface was coated with 3% by weight of $Li_{1.05}Ni_{0.7}Co_{0.2}Mn_{0.1}O_2$ having an average primary particle diameter of 0.5 μm. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 v charged condition, it was confirmed that an exothermic maximum peak temperature thereof was 245° C. Also, it was confirmed that the obtained Li—Ni composite particles had a discharge capacity of 185 mAh/g.

Comparative Example 2

The same procedure as defined in Example 1 was conducted except that in order to produce the Li—Ni composite oxide having a composition of $Li_{1.05}Ni_{0.4}Mn_{0.6}O_2$ which was to be coated or present on the core particles, there was used a solution prepared by mixing nickel sulfate and manganese sulfate as raw materials of Ni composite hydroxide with each other such that a molar ratio of Ni:Mn was 40:60, thereby obtaining Li—Ni composite oxide particles comprising secondary particles of $Li_{1.02}Ni_{0.8}Co_{0.15}Al_{0.05}O_2$ forming the core particles which had an average secondary particle diameter of 14.5 μm and whose surface was coated with 3% by weight of $Li_{1.05}Ni_{0.4}Mn_{0.6}O_2$ having an average primary particle diameter of 0.5 μm. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 282° C. Also, it was confirmed that the obtained Li—Ni composite particles had a discharge capacity of 172 mAh/g.

Comparative Example 3

The same procedure as defined in Example 1 was conducted except that in order to produce the Li—Ni composite oxide having a composition of $Li_{1.05}Ni_{0.3}Co_{0.3}Mn_{0.4}O_2$ which was to be coated or present on the core particles, there was used a solution prepared by mixing nickel sulfate, cobalt sulfate and manganese sulfate as raw materials of Ni composite hydroxide with each other such that a molar ratio of Ni:Co:Mn was 30:30:40, thereby obtaining Li—Ni composite oxide particles comprising secondary particles of $Li_{1.02}Ni_{0.8}Co_{0.15}Al_{0.05}O_2$ forming the core particles which had an average secondary particle diameter of 14.5 μm and whose surface was coated with 3% by weight of $Li_{1.05}Ni_{0.3}Co_{0.3}Mn_{0.4}O_2$ having an average primary particle diameter of 0.5 μm. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 278° C. Also, it was confirmed that the obtained Li—Ni composite particles had a discharge capacity of 178 mAh/g.

Comparative Example 4

The same procedure as defined in Example 1 was conducted except that the coating amount of $Li_{1.05}Ni_{1/3}Co_{1/3}Mn_{1/3}O_2$ which was to be coated or present on the core particles, was adjusted to 1% by weight, thereby obtaining Li—Ni composite oxide particles comprising secondary particles of $Li_{1.02}Ni_{0.8}Co_{0.15}Al_{0.05}O_2$ forming the core particles which had an average secondary particle diameter of 14.5 μm and whose surface was coated with 1% by weight of $Li_{1.05}Ni_{1/3}Co_{1/3}Mn_{1/3}O_2$ having an average primary particle diameter of 0.5 μm. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 243° C. Also, it was confirmed that the obtained Li—Ni composite particles had a discharge capacity of 186 mAh/g.

Comparative Example 5

The same procedure as defined in Example 1 was conducted except that the coating amount of $Li_{1.05}Ni_{1/3}Co_{1/3}Mn_{1/3}O_2$ which was to be coated or present on the core particles, was adjusted to 22% by weight, thereby obtaining Li—Ni composite oxide particles comprising secondary particles of $Li_{1.02}Ni_{0.8}Co_{0.15}Al_{0.05}O_2$ forming the core particles which had an average secondary particle diameter of 14.5 μm and whose surface was coated with 22% by weight of $Li_{1.05}Ni_{1/3}Co_{1/3}Mn_{1/2}O_2$ having an average primary particle diameter of 0.5 μm. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 283° C. Also, it was confirmed that the obtained Li—Ni composite particles had a discharge capacity of 175 mAh/g.

Comparative Example 6

The same procedure as defined in Example 1 was conducted except that in order to produce the Li—Ni composite oxide forming the core particles which had a composition of $Li_{1.05}Ni_{0.5}Co_{0.2}Mn_{0.3}O_2$, there was used a solution prepared by mixing nickel sulfate, cobalt sulfate and manganese sulfate as raw materials of Ni composite hydroxide with each other such that a molar ratio of Ni:Co:Mn was 50:20:30, and further in order to produce the Li—Ni composite oxide having a composition of $Li_{1.05}Ni_{0.9}Mn_{0.1}O_2$ which was to be coated or present on the core particles, there was used a solution prepared by mixing nickel sulfate and manganese sulfate as raw materials of Ni composite hydroxide with each other such that a molar ratio of Ni:Mn was 90:10, thereby obtaining Li—Ni composite oxide particles comprising secondary particles of $Li_{1.05}Ni_{0.5}Co_{0.2}Mn_{0.3}O_2$ forming the core particles which had an average secondary particle diameter of 14.5 μm and whose surface was coated with 3% by weight of $Li_{1.05}Ni_{0.9}Mn_{0.1}O_2$ having an average primary particle diameter of O_5 μm. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 238° C. Also, it was confirmed that the obtained Li—Ni composite particles had a discharge capacity of 184 mAh/g.

Comparative Example 7

The same procedure as defined in Example 1 was conducted except that in order to produce the Li—Ni composite oxide having a composition of $Li_{1.05}Ni_{1/3}Co_{1/3}Mn_{1/3}O_{1.93}F_{0.07}$ which was to be coated or present on the core particles, the Ni composite hydroxide and LiF were simultaneously mixed with lithium carbonate, thereby obtaining Li—Ni composite oxide particles comprising secondary particles of $Li_{1.02}Ni_{0.8}Co_{0.15}Al_{0.05}O_2$ forming the core particles which had an average secondary particle diameter of 14.5 μm and whose surface was coated with 3% by weight of $Li_{1.05}Ni_{1/3}Co_{1/3}Mn_{1/3}O_{1.93}F_{0.07}$ having an average primary particle diameter of 0.5 μm. At this time, it was confirmed that the average primary particle diameter of the particles which were coated or present on the core particles was 1/29 time the average secondary particle diameter of the core particles.

As a result of subjecting the thus obtained Li—Ni composite particles to differential thermal analysis under a 4.5 V charged condition, it was confirmed that an exothermic maximum peak temperature thereof was 265' c. Also, it was confirmed that the obtained Li—Ni composite particles had a discharge capacity of 178 mAh/g.

Comparative Example 8

The same procedure as defined in Example 1 was conducted except that in order to produce the Li—Ni composite oxide forming the core particles which had a composition of $Li_{1.05}Ni_{0.8}Co_{0.15}Al_{0.05}O_{1.93}F_{0.07}$, the Ni composite hydroxide and LiF were simultaneously mixed with lithium hydroxide, thereby obtaining Li—Ni composite oxide particles comprising secondary particles of $Li_{1.02}Ni_{0.8}Co_{0.15}Al_{0.05}O_{1.93}F_{0.07}$ forming the core particles which had an average secondary particle diameter of 14.5 μm and whose surface was coated with 3% by weight of $Li_{1.05}Ni_{1/3}Co_{1/3}Mn_{1/3}O_2$ having an average primary particle diameter of 0.5 μm. At this time, it was confirmed that the average primary particle diameter of the particles which were coated or present on the core particles was 1/29 time the average secondary particle diameter of the core particles.

As a result of subjecting the thus obtained Li—Ni particles to differential thermal analysis under a 4.5 V charged condition, it was confirmed that an exothermic maximum peak temperature thereof was 282° C. Also, it was confirmed that the obtained Li—Ni composite particles had a discharge capacity of 174 mAh/g.

Comparative Example 9

The Li—Ni composite oxide obtained in Example 1 which had a composition $Li_{1.02}Ni_{0.8}Co_{0.15}Al_{0.05}O_2$ and whose surface was however kept uncoated was subjected to differential thermal analysis under a 4.5 V charged condition. As a result, it was confirmed that an exothermic maximum peak temperature of the Li—Ni composite oxide was 240° C. Also, it was confirmed that the obtained Li—Ni composite had a discharge capacity of 186 mAh/g.

Comparative Example 10

The Li—Ni composite oxide obtained in Example 7 which had a composition of $Li_{1.02}Ni_{0.8}Co_{0.2}O_2$ and whose surface was however kept uncoated was subjected to differential thermal analysis under a 4.5 V charged condition. As a result, it was confirmed that an exothermic maximum peak temperature of the Li—Ni composite oxide was 220° C. Also, it was confirmed that the obtained Li—Ni composite had a discharge capacity of 190 mAh/g.

Comparative Example 11

The Li—Ni composite oxide obtained in Example 8 which had a composition of $Li_{1.02}Ni_{0.8}Co_{0.15}Mn_{0.05}O_2$ and whose surface was however kept uncoated was subjected to differential thermal analysis under a 4.5 V charged condition. As a result, it was confirmed that an exothermic maximum peak temperature of the Li—Ni composite oxide was 242° C. Also, it was confirmed that the obtained Li—Ni composite had a discharge capacity of 185 mAh/g.

Comparative Example 12

The Li—Ni composite oxide having a composition of $Li_{1.02}Ni_{0.5}Co_{0.2}Mn_{0.3}O_2$ whose surface was however kept uncoated was subjected to differential thermal analysis under a 4.5 V charged condition. As a result, it was confirmed that an exothermic maximum peak temperature of the Li—Ni composite oxide was 270° C. Also, it was confirmed that the obtained Li—Ni composite had a discharge capacity of 172 mAh/g.

With respect to the respective Li—Ni composite oxides obtained in Examples 1 to 11 and Comparative Examples 1 to 12, the composition of the core particles, the composition and the weight percentage of the particles which were coated or present on the core particles, the exothermic maximum peak temperature, the temperature by which the exothermic maximum peak temperature was shifted towards a high-temperature side upon the coating treatment, and the initial discharge capacity, are shown in Table 1.

TABLE 1

| Examples and Comparative Examples | Composition of core particles | Composition of particles coated or present on core particles |
|---|---|---|
| Example 1 | $LiNi_{0.8}Co_{0.15}Al_{0.05}O_2$ | $LiNi_{1/3}Co_{1/3}Mn_{1/3}O_2$ |
| Example 2 | $LiNi_{0.8}Co_{0.15}Al_{0.05}O_2$ | $LiNi_{0.45}Co_{0.2}Mn_{0.3}Al_{0.05}O_2$ |
| Example 3 | $LiNi_{0.8}Co_{0.15}Al_{0.05}O_2$ | $LiNi_{0.55}Co_{0.1}Mn_{0.3}Mg_{0.05}O_2$ |
| Example 4 | $LiNi_{0.8}Co_{0.15}Al_{0.05}O_2$ | $LiNi_{0.5}Mn_{0.5}O_2$ |
| Example 5 | $LiNi_{0.8}Co_{0.15}Al_{0.05}O_2$ | $LiNi_{0.5}Co_{0.2}Mn_{0.3}O_2$ |
| Example 6 | $LiNi_{0.8}Co_{0.15}Al_{0.05}O_2$ | $LiNi_{1/3}Co_{1/3}Mn_{1/3}O_2$ |
| Example 7 | $LiNi_{0.8}Co_{0.2}O_2$ | $LiNi_{1/3}Co_{1/3}Mn_{1/3}O_2$ |
| Example 8 | $LiNi_{0.8}Co_{0.15}Mn_{0.05}O_2$ | $LiNi_{1/3}Co_{1/3}Mn_{1/3}O_2$ |
| Example 9 | $LiNi_{0.8}Co_{0.15}Al_{0.05}O_2$ | $LiNi_{1/3}Co_{1/3}Mn_{1/3}O_{1.99}F_{0.01}$ |
| Example 10 | $LiNi_{0.8}Co_{0.15}Al_{0.05}O_{1.99}F_{0.01}$ | $LiNi_{1/3}Co_{1/3}Mn_{1/3}O_2$ |
| Example 11 | $LiNi_{0.8}Co_{0.15}Al_{0.05}O_{1.99}F_{0.01}$ | $LiNi_{1/3}Co_{1/3}Mn_{1/3}O_{1.99}F_{0.01}$ |
| Comp. Example 1 | $LiNi_{0.8}Co_{0.15}Al_{0.05}O_2$ | $LiNi_{0.7}Co_{0.2}Mn_{0.1}O_2$ |
| Comp. Example 2 | $LiNi_{0.8}Co_{0.15}Al_{0.05}O_2$ | $LiNi_{0.4}Mn_{0.6}O_2$ |
| Comp. Example 3 | $LiNi_{0.8}Co_{0.15}Al_{0.05}O_2$ | $LiNi_{0.3}Co_{0.3}Mn_{0.4}O_2$ |
| Comp. Example 4 | $LiNi_{0.8}Co_{0.15}Al_{0.05}O_2$ | $LiNi_{1/3}Co_{1/3}Mn_{1/3}O_2$ |
| Comp. Example 5 | $LiNi_{0.8}Co_{0.15}Al_{0.05}O_2$ | $LiNi_{1/3}Co_{1/3}Mn_{1/3}O_2$ |
| Comp. Example 6 | $LiNi_{0.5}Co_{0.2}Mn_{0.3}O_2$ | $LiNi_{0.9}Mn_{0.1}O_2$ |
| Comp. Example 7 | $LiNi_{0.8}Co_{0.15}Al_{0.05}O_2$ | $LiNi_{1/3}Co_{1/3}Mn_{1/3}O_{1.93}F_{0.07}$ |
| Comp. Example 8 | $LiNi_{0.8}Co_{0.15}Al_{0.05}O_{1.93}F_{0.07}$ | $LiNi_{1/3}Co_{1/3}Mn_{1/3}O_2$ |
| Comp. Example 9 | $LiNi_{0.8}Co_{0.15}Al_{0.05}O_2$ | — |
| Comp. Example 10 | $LiNi_{0.8}Co_{0.2}O_2$ | — |
| Comp. Example 11 | $LiNi_{0.8}Co_{0.15}Mn_{0.05}O_2$ | — |
| Comp. Example 12 | $LiNi_{0.5}Co_{0.2}Mn_{0.3}O_2$ | — |

TABLE 1-continued

| Examples and Comparative Examples | Average particle diameter of core particles (a) (μm) | Average particle diameter of particles coated or present on core particles (b) (μm) | (b)/(a) | weight percentage of particles coated or present on core particles (%) |
|---|---|---|---|---|
| Example 1 | 14.5 | 0.5 | 1/29 | 3 |
| Example 2 | 14.5 | 0.5 | 1/29 | 3 |
| Example 3 | 14.5 | 0.5 | 1/29 | 3 |
| Example 4 | 14.5 | 0.5 | 1/29 | 3 |
| Example 5 | 14.5 | 2.0 | 4/29 | 3 |
| Example 6 | 14.5 | 0.5 | 1/29 | 15 |
| Example 7 | 14.5 | 0.5 | 1/29 | 3 |
| Example 8 | 10.0 | 0.5 | 1/20 | 3 |
| Example 9 | 14.5 | 0.5 | 1/29 | 3 |
| Example 10 | 14.5 | 0.5 | 1/29 | 3 |
| Example 11 | 14.5 | 0.5 | 1/29 | 3 |
| Comp. Example 1 | 14.5 | 0.5 | 1/29 | 3 |
| Comp. Example 2 | 14.5 | 0.5 | 1/29 | 3 |
| Comp. Example 3 | 14.5 | 0.5 | 1/29 | 3 |
| Comp. Example 4 | 14.5 | 0.5 | 1/29 | 1 |
| Comp. Example 5 | 14.5 | 0.5 | 1/29 | 22 |
| Comp. Example 6 | 14.5 | 0.5 | 1/29 | 3 |
| Comp. Example 7 | 14.5 | 0.5 | 1/29 | 3 |
| Comp. Example 8 | 14.5 | 0.5 | 1/29 | 3 |
| Comp. Example 9 | 14.5 | — | — | — |
| Comp. Example 10 | 14.5 | — | — | — |
| Comp. Example 11 | 14.5 | — | — | — |
| Comp. Example 12 | 14.5 | — | — | — |

| Examples and Comparative Examples | Exothermic maximum peak temperature (° C.) | Shift temperature Δ (° C.) | Initial discharge capacity (mAh/g) |
|---|---|---|---|
| Example 1 | 276 | 36 | 183 |
| Example 2 | 261 | 21 | 184 |
| Example 3 | 256 | 16 | 185 |
| Example 4 | 280 | 40 | 180 |
| Example 5 | 273 | 33 | 184 |
| Example 6 | 282 | 42 | 182 |
| Example 7 | 265 | 45 | 185 |
| Example 8 | 267 | 25 | 182 |
| Example 9 | 281 | 41 | 182 |
| Example 10 | 278 | 38 | 183 |
| Example 11 | 284 | 44 | 181 |
| Comp. Example 1 | 245 | 5 | 185 |

TABLE 1-continued

| | | | |
|---|---|---|---|
| Comp. Example 2 | 282 | 42 | 172 |
| Comp. Example 3 | 278 | 12 | 178 |
| Comp. Example 4 | 243 | 12 | 186 |
| Comp. Example 5 | 283 | 43 | 175 |
| Comp. Example 6 | 238 | −2 | 184 |
| Comp. Example 7 | 265 | 25 | 178 |
| Comp. Example 8 | 282 | 42 | 174 |
| Comp. Example 9 | 240 | — | 186 |
| Comp. Example 10 | 220 | — | 190 |
| Comp. Example 11 | 242 | — | 185 |
| Comp. Example 12 | 270 | — | 172 |

In all of the Li—Ni composite oxide particles obtained in Examples 1 to 11, an exothermic maximum peak thereof was increased by 15° C. or higher as compared to the exothermic maximum peak of the core particles (shifted towards a high-temperature side). In addition, these Li—Ni composite oxide particles were prevented from undergoing the reaction with an electrolyte solution under a charged condition by allowing the Li—Ni composite oxide as defined in claims 1 to 6 on the surface of the respective core particles, and were, therefore, capable of providing a positive electrode material having an excellent thermal stability.

Further, the Li—Ni composite oxide particles obtained in Examples 1 to 11 all exhibited an initial discharge capacity of not less than 180 mAh/g, and were, therefore, capable of providing a positive electrode material having a high discharge capacity.

Figure 2:
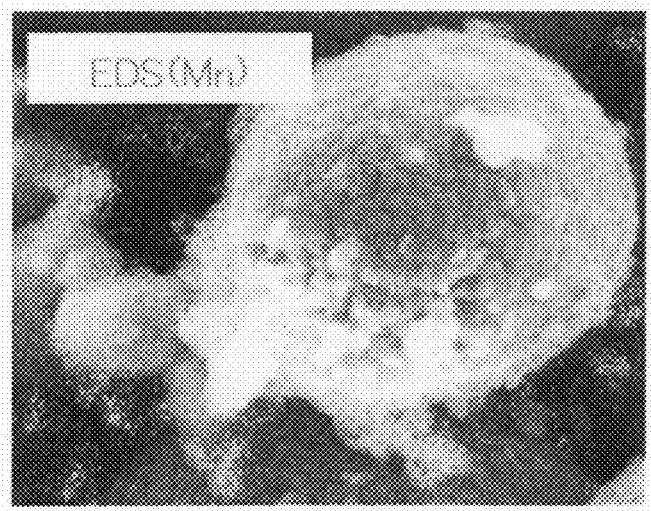
FIG. 2 is a photograph (EDS) showing a condition of presence of Mn in the Li—Ni composite oxide particles obtained in Example 1.

The results of observation of the surface condition of the Li—Ni composite oxide particles obtained in Example 1 by the above method are shown in FIGS. 1 and 2.

From FIGS. 1 and 2, it was confirmed that in the Li—Ni composite oxide particles obtained in Example 1, the Li—Ni composite oxide as described in Invention 1 was present on the surface of the respective secondary particles of the Li—Ni composite oxide forming the core particles.

Figure 3:
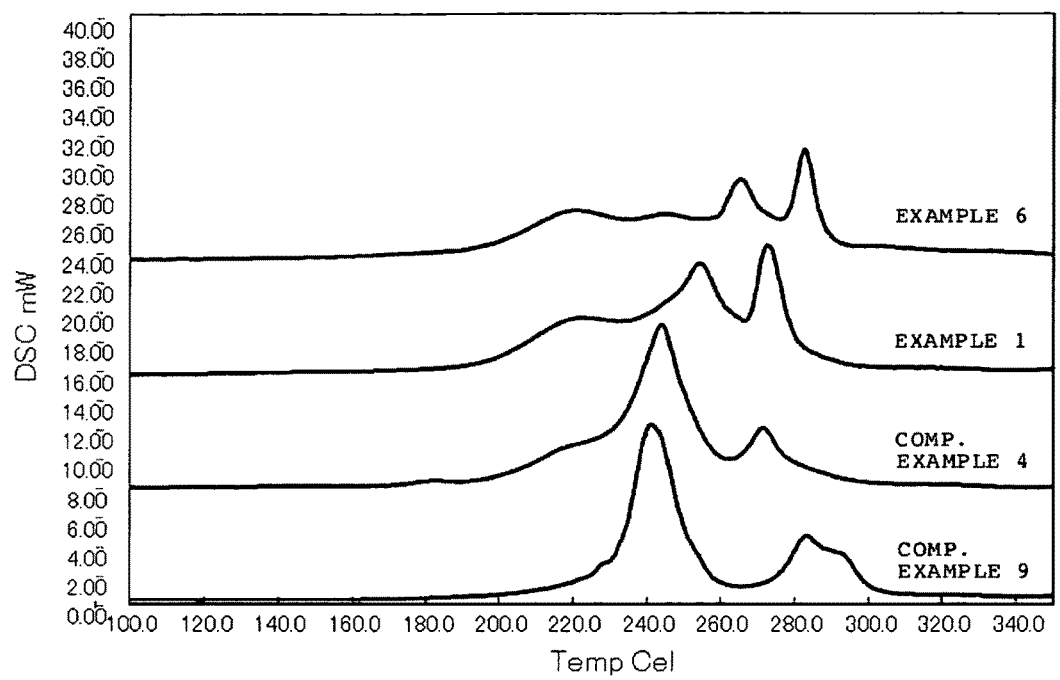
FIG. 3 is a graph showing the results of differential thermal analysis of coin cells using the Li—Ni composite oxide particles obtained in Examples 1 and 6 and Comparative Examples 4 and 9.

The results of differential thermal analysis for evaluating a safety of respective coin cells obtained by using the Li—Ni composite oxide particles obtained in Examples 1 and 6 and Comparative Examples 4 and 9 are shown in FIG. 3.

From FIG. 3, it was confirmed that the Li—Ni composite oxide particles obtained in Example 1 in which the Li—Ni composite oxide particles as described in Inventions 1 to 4 were present on the surface of the respective core particles such that the coating amount of the former particles was not less than 3% by weight, were improved in thermal stability under a charged condition.

From the results as discussed above, it was recognized that the Li—Ni composite oxide particles according to the present invention had a large charge/discharge capacity and were effective as an active material for a non-aqueous electrolyte cell having an excellent thermal stability under a charged condition.

When using Li—Ni composite oxide particles for a non-aqueous electrolyte secondary battery which comprise secondary particles of a Li—Ni composite oxide which form core particles thereof and have a composition represented by the formula: $Li_{x1}Ni_{1-y1-z1-w1}Co_{y1}Mn_{z1}M_{w1}O_2$ (in which $0.9 \leq x1 \leq 1.3$; $0.1 \leq y1 \leq 0.3$; $0.0 \leq z1 \leq 0.3$; $0 \leq w1 \leq 0.1$; and M is at least one metal selected from the group consisting of Al and Fe), wherein a Li—Ni composite oxide having a composition represented by the formula: $Li_{x2}Ni_{1-y2-z2-w2}Co_{y2}Mn_{z2}M_{w2}O_2$ (in which $0.9 \leq x2 \leq 1+z2$; $0 \leq y2 \leq 0.33$; $0 \leq z2 \leq 0.5$; $0 \leq w2 \leq 0.1$; and M is at least one metal selected from the group consisting of Al, Fe, Mg, Zr and Ti, with the proviso that $0.5 \leq (1-y2-z2-w2)/(y2+z2+w2)$, $0.3 \leq (z1+z2)$ and $0 < (z2-z1) \leq 0.5$), is coated or present on a surface of the respective secondary particles, it is possible to obtain a non-aqueous electrolyte cell having a large charge/discharge capacity and an excellent thermal stability under a charged condition.

In the foregoing, although the present invention is explained in detail by Examples, the numeral ranges as defined in the present invention are necessarily intended to involve all of the ranges using an optional numeral described in any of the above Examples as a critical value unless departing from the scope of the present invention, and it should be construed that all of them are described in the present specification.

The invention claimed is:

1. Li—Ni composite oxide particles for a non-aqueous electrolyte secondary battery, comprising a Li—Ni composite oxide whose secondary particles form core particles thereof and have a composition represented by the formula:

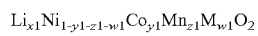

in which $0.9 \leq x1 \leq 1.3$; $0.1 \leq y1 \leq 0.3$; $0.0 \leq z1 \leq 0.3$; $0.05 \leq w1 \leq 0.1$; and M is Al, wherein a Li—Ni composite oxide having a composition represented by the formula:

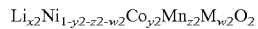

in which $0.9 \leq x2 \leq 1+z2$; $0 \leq y2 \leq 0.33$; $0 \leq z2 \leq 0.5$; $0 \leq w2 \leq 0.1$; and M is Al with the proviso that $0.5 \leq (1-y2-z2-w2)/(y2+z2+w2)$, $0.3 \leq (z1+z2)$ and $0 < (z2-z1) \leq 0.5$), is coated or present on a surface of the respective secondary particles.

2. Li—Ni composite oxide particles for a non-aqueous electrolyte secondary battery according to claim 1, wherein a weight percentage of the Li—Ni composite oxide which is coated or present on the surface of the Li—Ni composite oxide forming the core particles is not less than 3% and not more than 20% based on the weight of the Li—Ni composite oxide forming the core particles, or a ratio of a content of Ni element in the Li—Ni composite oxide which is coated or present on the surface of the Li—Ni composite oxide forming the core particles to a content of Ni element in the Li—Ni composite oxide forming the core particles satisfies the relationship represented by the formula:

$$(1-y2-z2-w2)/(1-y1-z1-w1) \leq 1.$$

3. Li—Ni composite oxide particles for a non-aqueous electrolyte secondary battery according to claim 1, wherein when using a negative electrode formed from a metallic lithium or a material which allows a lithium ion to be intercalated and de-intercalated to the Li—Ni composite oxide forming the core particles, an exothermic maximum peak thereof observed at a temperature ranging from 200 to 290° C. in a differential thermal analysis under a 4.5 V charged condition is increased by 15° C. or more.

4. Li—Ni composite oxide particles for a non-aqueous electrolyte secondary battery according to claim 1, wherein a discharge capacity thereof as measured at a charge/discharge rate of 0.2 mA/cm$^2$ in the range of 4.3 to 3.0 V with respect to a negative electrode formed from a material which allows a metallic lithium or a lithium ion to be intercalated and de-intercalated to the Li—Ni composite oxide forming the core particles, is not less than 180 mAh/g.

5. A process for producing the Li—Ni composite oxide particles for a non-aqueous electrolyte secondary battery as defined in claim 1, comprising:
allowing the Li—Ni composite oxide to be coated or present on a surface of the respective secondary particles of the Li—Ni composite oxide forming the core particles by subjecting these materials to a wet chemical treatment or a dry mechanical treatment, or further to a thermal treatment in an oxygen atmosphere at a temperature of not lower than 250° C. for 10 min or longer in addition to the wet or dry treatment.

6. A non-aqueous electrolyte secondary battery comprising a positive electrode comprising a positive electrode active material formed from the Li—Ni composite oxide particles for a non-aqueous electrolyte secondary battery as defined in claim 1.

7. Li—Ni composite oxide particles for a non-aqueous electrolyte secondary battery, comprising a Li—Ni composite oxide whose secondary particles form core particles thereof and have a composition represented by the formula:

$$Li_{x1}Ni_{1-y1-z1-w1}Co_{y1}Mn_{z1}M_{w1}O_{2-v1}K_{v1}$$

in which $0.9 \leq x1 \leq 1.3$; $0.1 \leq y1 \leq 0.3$; $0.0 \leq z1 \leq 0.3$; $0.05 \leq w1 < 0.1$; $0 \leq v1 \leq 0.05$; M is Al; and K is at least one anion selected from the group consisting of $F^-$ and $PO_4^{3-}$,
wherein a Li—Ni composite oxide having a composition represented by the formula:

$$Li_{x2}Ni_{1-y2-z2-w2}Co_{y2}Mn_{z2}M_{w2}O_{2-v2}K_{v2}$$

in which $0.9 \leq x2 \leq 1+z2$; $0 \leq y2 \leq 0.33$; $0 \leq z2 \leq 0.5$; $0 \leq w2 \leq 0.1$; and $0 \leq v2 \leq 0.05$, with the proviso that $0.5 \leq (1-y2-z2-w2)/(y2+z2+w2)$, $0.3 \leq (z1+z2)$ and $0 < (z2-z1) \leq 0.5$); M is at least one metal selected from the group consisting of Al, Fe, Mg, Zr and Ti; and K is at least one anion selected from the group consisting of $F^-$ and $PO_4^{3-}$,
is coated or present on a surface of the respective secondary particles.

8. Li—Ni composite oxide particles for a non-aqueous electrolyte secondary battery, comprising a Li—Ni composite oxide whose secondary particles form core particles thereof and have a composition represented by the formula:

$$Li_{x1}Ni_{1-y1-z1-w1}Co_{y1}Mn_{z1}M_{w1}O_{2-v1}K_{v1}$$

(in which $1.0 < x1 \leq 1.3$; $0.1 \leq y1 \leq 0.3$; $0.0 \leq z1 \leq 0.3$; $0 \leq w1 < 0.1$; $0 < v1 \leq 0.05$; M is at least one metal selected from the group consisting of Al and Fe; and K is at least one anion selected from the group consisting of $F^-$ and $PO_4^{3-}$),
wherein a Li—Ni composite oxide having a metal mol number of $(x1-1)$ and a composition represented by the formula:

$$Li_{x2}Ni_{1-y2-z2-w2}Co_{y2}Mn_{z2}M_{w2}O_{2-v2}K_{v2}$$

in which $0 \leq y2 \leq 0.33$; $0 \leq z2 \leq 0.5$; $0 \leq w2 \leq 0.1$; and $0 \leq v2 \leq 0.05$, with the proviso that $0.5 \leq (1-y2-z2-w2)/(y2+z2+w2)$, $0.3 \leq (z1+z2)$ and $0 < (z2-z1) \leq 0.5$; M is A; and K is at least one anion selected from the group consisting of $F^-$ and $PO_4^{3-}$,
is coated or present on a surface of the respective secondary particles.

* * * * *